United States Patent [19]

Simokat

[11] 4,209,667
[45] Jun. 24, 1980

[54] SUBSCRIBER DROP-CONNECTED CIRCUITS

[75] Inventor: Frank L. Simokat, Babylon, N.Y.

[73] Assignee: TII Industries, Inc., Lindenhurst, N.Y.

[21] Appl. No.: 878,657

[22] Filed: Feb. 16, 1978

[51] Int. Cl.² ........................................... H04M 13/00
[52] U.S. Cl. ................................................. 179/17 A
[58] Field of Search ............... 179/17 A, 17 E, 84 L, 179/84 A, 18 FH, 84 R, 18 B, 17 R

[56] References Cited

U.S. PATENT DOCUMENTS

| | | | |
|---|---|---|---|
| 3,230,316 | 1/1966 | Hunt | 179/17 E |
| 3,300,589 | 1/1967 | Carter | 179/17 E |
| 3,303,289 | 2/1967 | Hawlyey et al. | 179/17 E |
| 3,916,111 | 10/1975 | Ott | 179/17 E |
| 4,001,512 | 1/1977 | Proctor et al. | 179/17 A |
| 4,021,617 | 5/1977 | Jones, Jr. et al. | 179/17 E |
| 4,031,332 | 6/1977 | Shylo | 179/84 R |
| 4,054,942 | 10/1977 | Chambers, Jr. | 179/17 A |
| 4,079,205 | 3/1978 | Glenn | 179/17 A |

*Primary Examiner*—Bernard Konick
*Assistant Examiner*—Randall P. Myers
*Attorney, Agent, or Firm*—Le Blanc, Nolan, Shur & Nies

[57] ABSTRACT

A unit adapted to be connected to the tip party's subscriber's drop in a two-party line without requiring access to or rewiring of the tip party's telephone and having interconnected ringer isolator and ANI mark circuits. The ringer isolator and the ANI mark circuits may also be used individually.

37 Claims, 7 Drawing Figures

SUBSCRIBER DROP-CONNECTED CIRCUITS

FIELD OF THE INVENTION

This invention generally relates to telephone system equipment that is used at the subscriber's end of a subscriber's line in conjunction with a telephone station. More particularly, this invention is concerned with ringer isolator and ANI (automatic number identification) mark circuits.

BACKGROUND

Ringer isolator circuits are used to eliminate electrical noise that results from ringer ground connections during the talking state of a telephone call while the called and calling parties are connected to each other. This is accomplished by keeping the telephone ringer isolated or disconnected from ground except for the periods when a central office ringing signal voltage is applied to ring the telephone.

ANI mark circuits (also referred to as station identification circuits) are used with plural party lines to identify toll calls dialed by a selected party (customarily the tip party as distinguished from the ring party) for billing purposes in an automatic number identication system.

Prior to this invention it has generally been the practice to wire ringer isolator and ANI mark circuits directly into the telephone sets. It also has been a custom to incorporate the ANI mark circuits into the telephone sets at the time of manufacture, but to make the circuit connections in such a way that the ANI mark circuit remains inactive or disabled until such time that it is desired to install the telephone at a tip party's station on a two-party line.

Because of this custom, service calls are frequently needed when a telephone set is later assigned to a new or different subscriber for the purpose of converting the set in some cases to single party or ring party use and in other cases to tip party use.

In many cases existing telephones already on subscriber's premises are not equipped with ANI mark circuits. If they require conversion to tip party use, service calls are required, and access to the telephone is needed where it is desired to use the type of ANI mark circuit that must be physically incorporated or wired into the telephone itself. Likewise, house calls are required to equip subscribers' telephones with the type of ringer isolator that is assembled in the telephone itself.

Many times, however, no one is at home at the subscriber's home to admit the service man when he arrives. Return calls are therefore needed, and special arrangements sometimes have to be made to enable the service man to gain access to the telephone in the subscriber's home. This leads to increased costs in providing service to the subscriber. For example, each trip made by a telephone company's service man to a subscriber's home presently costs forty to fifty dollars even for occasions where he finds no one at home.

To avoid these problems and to lower the costs attendent with service calls it has been proposed to design the ANI mark equipment in such a way that it need not be physically housed in the telephone set. One example of such an ANI mark circuit is shown in FIG. 2 of the U.S. Pat. No. 4,001,512 which issued to D. F. Proctor on Jan. 4, 1977. Another example of this type of circuit is described in U.S. Pat. No. 4,054,942 which issued to C. W. Chambers, Jr. on Oct. 18, 1977.

Both of these prior ANI mark circuits may be installed without requiring access to the subscriber's telephone. As a result, no changes are required in the telephone itself or the wiring to the telephone to convert the telephone station to tip party use on a two-party line. The ANI mark circuits described in the above-mentioned patents, however, have some serious drawbacks.

In both patents, for example, the circuit designs are such that insertion or line losses are created by electrical components which are connected in the subscriber loop itself in series with one or both of the tip and ring conductors. In U.S. Pat. No. 4,054,942 and in one of the embodiments in U.S. Pat. No. 4,001,512 there is the additional problem of electrical noise which is created by grounding one of the two subscriber line conductors (usually the tip conductor) through a resistor, but not the other conductor in the course of establishing the ground mark. The circuits described in U.S. Pat. No. 4,001,512 also create a longitudinal line imbalance problem because certain components require connection in series with one side of the subscriber loop or line and not the other.

In another type of prior ANI mark circuit, the base-emitter junction of a bipolar transistor is connected across a resistor that is in series with the tip conductor of the tip party's drop, and the collector of the transistor is connected to ground through a resistor (usually 2.6 K$\Omega$). With this circuit design, loop current flow in the tip party's loop circuit turns on the transistor to create a difference in the currents flowing in the tip and ring conductors. The resulting current difference is sensed by ANI equipment in the central office. This ANI station identification circuit is referred to as the differential type and cannot be employed with the longitudinal type of identification in which a current path to ground is sensed at the central office to identify the calling party as the tip party.

Examples of prior ringer isolator circuits are described in U.S. Pat. No. 3,916,111 issued to H. W. Ott on Oct. 28, 1975, U.S. Pat. No. 3,303,289 issued to M. S. Hawley et al on Feb. 7, 1967, and U.S. Pat. No. 3,230,316 issued to P. M. Hunt on Jan. 18, 1966.

These patented ringer isolated circuits for the most part are normally wired into the telephone set itself and therefore present the problem of obtaining access to the telephone to make the installation.

Another type of ringer isolator unit marketed by the Cook Electric Company, however, is especially adapted to be connected outdoors to the subscriber's drop to avoid the problem of requiring access to the telephone itself. The Cook Electric ring isolator is a.c. coupled by a first capacitor to the subscriber's line to couple the ringing signal to a diode rectifier for rectification. The recitified ringing signal current charges a second capacitor which is shunted across a neon bulb. When the voltage built up across the second capacitor reaches the firing potential of the neon bulb, the bulb conducts to emit light which is directed to control the resistance of a light sensitive resistor. The light sensitive resistor controls current to the gate of a SCR (silicon control rectifier) which is connected in a bridge between the telephone's ringer and ground. Impingement of the light from the neon bulb on the light sensitive resistor turns the SCR on to connect the telephone ringer to ground for ringing the telephone. Although this ring isolator operates satisfactorily, it has a number of drawbacks.

First, the Cook ringer isolator unit is large and bulky. Second, the two capacitors in the unit described above are not protected against voltage faults or transients. Third, it operates only in response to an a.c. input and is not equipped to handle superimposed ringing. Fourth, it is not equipped to optionally handle elevated voltages.

The present invention avoids the foregoing problems and drawbacks as well as offering additional advantages as will become apparent from the following summary and description.

SUMMARY & OBJECTS OF INVENTION

The present invention provides a novel ringer isolator circuit and a novel ANI mark or station identification circuit which may be used individually or combined into a common unit for connection to a subscriber's drop without requiring access to or rewiring of the subscriber's telephone. The unit containing the combined, electrically compatible ringer isolator and ANI mark circuits may also optionally include a station protector such as a gas tube arrestor.

The ringer isolator circuit of this invention is an electronic switch having a single capacitor and operating to connect the telephone ringer to ground only upon sensing the presence of ringing voltage across the tip and ring sides of a telephone line. In the ringer isolator of this invention the central office ringing signal is d.c. coupled to a zener diode for rectification. The rectified signal current charges the circuit's single capacitor which is connected across a neon tube. When the voltage across the capacitor rises to a preselected value the neon tube is fired to emit light onto a light sensitive resistor. The light sensitive resistor thereupon feeds gate current to a Triac to turn the Triac on. The Triac is connected between the telephone ringer and ground so that when it turns on, it connects the ringer to ground.

In addition to rectifying the incoming ringing signal, the zener diode mentioned above protects the capacitor against fault voltages.

The ringer isolator of this invention is also equipped with a high voltage option to facilitate the use of the isolator circuit with a central office having an elevated battery voltage.

By d.c. coupling incoming ringing signals into the ringer isolator circuit of this invention and by using the above-mentioned zener diode the circuit is made polarity sensitive and therefore may be used with superimposed multiparty coded ringing and other ringing schemes.

As compared with some prior ringer isolators, the ringer isolator of this invention has fewer components, is less expensive to manufacture and may be incorporated into a smaller package.

In one embodiment, the ANI mark circuit of this invention operates to apply a ground mark in response to the first interruption of loop current after the tip party's telephone is lifted off-hook to enable the central office equipment to sense the presence of a current path to ground.

In one of the illustrated embodiments of the ANI mark circuit, a ground mark squelch circuit is responsive to the initial loop current flow when the tip party's telephone is lifted off-hook to enable a ground mark switching circuit to charge a capacitor. When the central office lifts the loop current off the line to initiate a toll ticketing condition, the switching circuit discharges the capacitor to operate a device for applying a tip-to-ground mark and ring-to-ground mark through equal resistances.

The ANI mark circuit of this invention is designed in such a way that practically no insertion or line losses or imbalances are introduced into the tip party's line. Furthermore, the ANI mark circuit of this invention operates to remove the ground mark during open loop dialing pulses to avoid distortion of the pulses.

With the foregoing in mind, a major object of this invention is to provide a novel ANI mark circuit which is not subject to the previously described disadvantages of prior ANI mark circuits.

Another major object of this invention is to provide a novel ringer isolator which also is not subject to the disadvantages mentioned in connection with the prior ringer isolators.

Still another important object of this invention is to provide a novel unit which incorporates a combined ringer isolator and ANI mark circuit and which is adapted to be connected outdoors to a subscriber drop without requiring access to or rewiring of the subscriber's telephone.

A further object of this invention is to provide a novel ANI mark circuit which applies a ground mark in response to the interruption of loop current after the tip party's telephone has been lifted off-hook.

Yet another object of this invention is to provide a novel ANI mark circuit which removes the ground mark during open loop dialing pulses to avoid distortion of the pulses.

Still another important object of this invention is to provide for a novel ANI mark circuit which employs a unique ground mark squelch.

A further object of this invention is to provide a novel ringer isolator having but a single capacitor and a rectifying zener diode which provides protection for the capacitor against fault voltages.

Still another object of this invention is to provide a novel ringer isolator which has only a small number of components, which is economical to manufacture, and which can be incorporated into a small package.

Further objects of this invention will appear as the description proceeds in connection with the appended claims and the below-described drawings.

DETAILED DESCRIPTION

Figure 1:
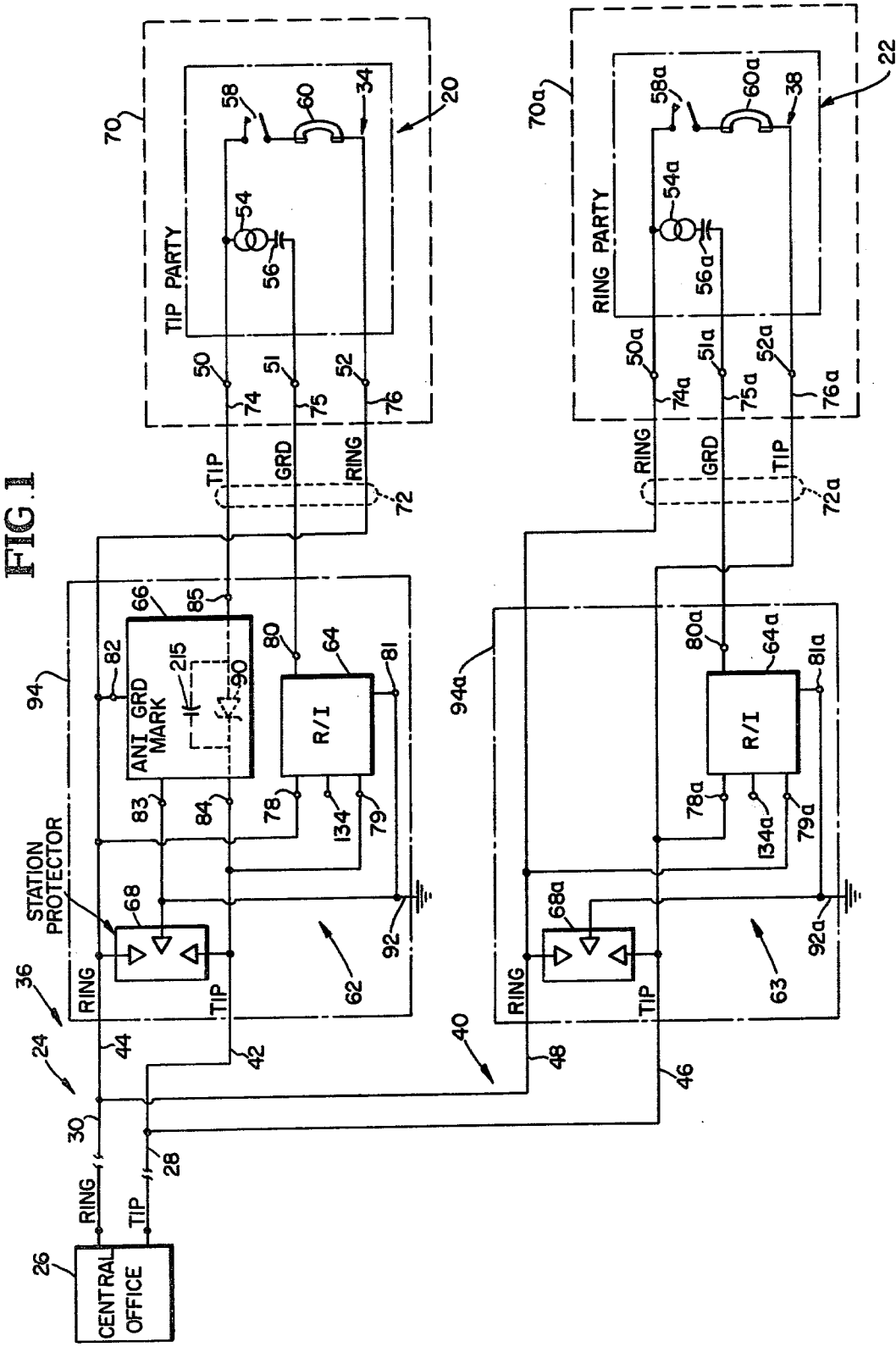
FIG. 1 is a schematic diagrahm of a two-party telephone system incorporating the principles of this invention.

In FIG. 1 a two party subscriber loop circuit incorporating the principles of this invention is shown comprising a tip party telephone station 20 and a ring party telephone station 22.

The telephone set in the tip party's station 20 is generally indicated at 34 and is connected by way of a subscriber's drop 36 (sometimes referred to as a drop wire) and a telephone or transmission line 24 to a central office 26. The telephone set in the ring party's station 22 is generally indicated at 38 and is connected by a separate subscriber's drop 40 and line 24 to the central office.

Line 24 is common to telephone stations 20 and 22 and has tip and ring conductors 28 and 30 as shown. Drop 26 and line 24 combine to define a first subscriber's loop or line for the tip party, and drop 40 and line 24 combine to define a second subscriber's loop or line for the ring party.

Still referring to FIG. 1, the subscriber drop 36 has tip and ring conductors 42 and 44 which respectively connect to the tip and ring conductors of line 24. Likewise, drop 40 has tip and ring conductor 46 and 48 which respectively connect to the tip and ring conductors of line 24.

Telephone set 34 comprises a conventional 3 wire circuit having three terminals 50, 51 and 52 for making wiring connections to the plant or facility outside of the subscriber's dwelling. As shown, set 34 includes a ringer 54 and a capacitor 56 connected in series between terminals 50 and 51 and also a hook switch 58 and a handset 60 connected in series between terminals 50 and 52.

The ring party's telephone set 38 is the same as the tip party's telephones 34. Like reference characters have therefore been applied to designate corresponding components of sets 34 and 38 except that the reference numerals for set 38 have been suffixed by the letter a to distinguish them from the reference numerals applied to set 34.

The tip and ring party station units incorporating the principles of this invention are respectively indicated at 62 and 63 in FIG. 1. The tip party unit 62 is connected to the subscriber's end of drop 36, and the ring party unit 63 is similarly connected to the subscriber's end of drop 40. In this embodiment unit 62 comprises a ringer isolator 64 and an ANI ground mark station identification circuit 66. A station protector 68 may optionally be included in unit 62 as shown. Station protector 68 may be a conventional three electrode gas tube surge arrester such as the Series T11-300 manufactured by the TII Corporation.

Unit 62 is normally located outside of the tip party's home or building which houses telephone set 34 and which is schematically indicated in dashed lines at 70 in FIG. 1. Terminals 50–52 of telephone set 34 are connected by a three-conductor station wire 72 to unit 62 in a manner to be described in detail shortly.

As shown, the three conductors of the station wire 72 are indicated at 74, 75 and 76 in FIG. 1 and are respectively connected to terminals 50, 51 and 52. In this embodiment, the ringer isolator is provided with four operating terminals 78, 79, 80 and 81, and the ANI mark circuit 66 also has four terminals as indicated at 82, 83, 84 and 85.

As shown, the ring side or ring conductor 44 of drop 36 is connected to one end electrode of the gas tube surge protector 68, to terminals 78 and 82 and through conductor 76 to terminal 52. The tip side or tip conductor 42 of drop 36 is connected to the other end electrode of protector 68, and to terminals 79 and 84.

In the ANI mark circuit 66 a current conducting path is established between terminals 84 and 85 through a zener diode 90 and a capacitor 215 to extend the tip side of the line. Conductor 74 connects terminal 85 to terminal 50, and conductor 75 connects terminal 51 to terminal 80. The center electrode of protector 68 and terminals 81 and 83 are all connected by a common ground wire 92 to earth ground.

With the circuit connections just described for the gas tube protector 68, the gas tube will fire when lightning or other induced surge occurs to cause both the tip and ring sides of drop 26 to become grounded through the gas tube's high conductivity ion path to the tube's center electrode which is connected to earth ground.

In addition to being electrically combined or connected in unit 62 in the manner shown, protector 68, ringer isolator 64 and the ANI mark circuit 66 may advantageously be incorporated into a common package or container which is schematically indicated at 94 in FIG. 1.

Alternatively, protector 68 may be located outside of unit 62 and container 94. With such an arrangement unit 62 will consist of ringer isolator 64 and the ANI mark circuit 66 and may be mounted at protector 68. In either case, unit 62, with or without protector 68, makes access to or rewiring of the station telephone 34 unnecessary.

Furthermore, the ringer isolator 64 and the ANI mark circuit 66 may be used individually. That is, ringer isolator 64 may be used without the ANI mark circuit 66, and the ANI mark circuit 66 may be used without ringer isolator 64. As is apparent, access to or rewiring of the subscriber's telephone is also unnecessary when either the ringer isolator 64 or the ANI mark circuit 66 is used individually.

The ring party unit 63 is the same as the tip party unit 62 except that is does not have an ANI ground mark station identification circuit. Additionally, the circuit connections to telephone set 38 and the ringer isolator in unit 63 differ as will be described in detail later on. To the extent that unit 63 is the same as unit 62, like reference numerals suffixed by the letter a have been applied to designate corresponding components of unit 63.

Figure 2:
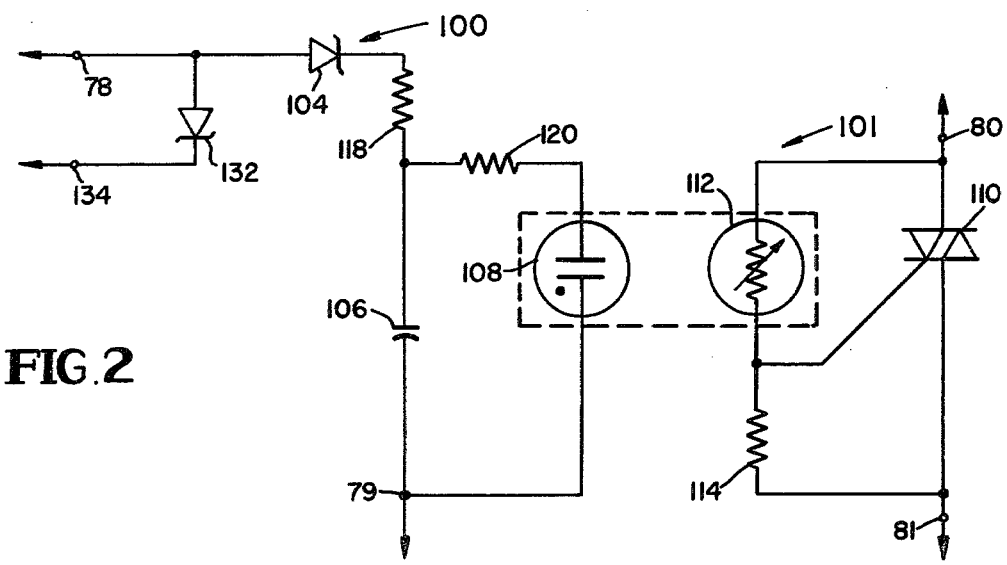
FIG. 2 is a schematic circuit diagrahm of the ringer isolator shown in FIG. 1.

Referring now to FIG. 2, ringer isolator 64 constitutes an electronic switch that senses the presence of ringing voltage and electrically connects the telephone ringer 54 to ground. To accomplish this, the illustrated embodiment of ringer isolator 64 is shown to comprise a pair of circuits 100 and 101 which are electrically isolated from each other in the sense that there is no metallic current conducting path between them.

Circuit 100 comprises a zener diode 104, a capacitor 106 and a two terminal neon tube or bulb 108. Circuit 101 comprises a Triac 110 and a light sensitive resistor 112 which is light coupled to tube 108 for controlling gate current to Triac 110.

As shown, resistor 112 is connected in series with a resistor 114 of fixed resistance between terminals 80 and 81, and Triac 110 is connected between terminals 80 and 81 in parallel with the series combination of resistors 112 and 114. The junction of resistors 112 and 114 is connected to the gate electrode of Triac 110 to feed gate current to the Triac. When no light is directed on resistor 112 its resistance will be very high to effectively present an open circuit.

From the description thus far it is clear that Triac 110 is connected in series with ringer 54 between the ringer and ground. When Triac 110 is in its non-conducting state and no light is directed onto resistor 112 the circuit between ringer 54 and ground will be open so that no current can be conducted through the ringer. When Triac 110 is turned on, it completes a circuit for ringing ringer 54 so that when negative central office battery potential (e.g., −48 volts) is applied to the tip side of line 24, current will be conducted from ground through Triac 110, conductor 75, ringer 54, conductor 74, diode 90 and the tip side of drop 36 to tip conductor 28.

With continued reference to FIG. 2, zener diode 104, a pair of resistors 118 and 120 and neon tube 108 are all connected in series between terminals 78 and 79 in the manner shown. Capacitor 106 is connected between resistor 118 and terminal 79 in parallel with the series combination of resistor 120 and neon bulb 108. A current path for charging capacitor 106 is therefore established serially through zener diode 104, resistor 118 and the capacitor which are all connected in series between terminals 78 and 79.

Zener diode 104 has its anode connected to terminal 78 as shown. Diode 104 will therefore be forward biased to feed charging current to capacitor 106 when the potential at terminal 79 is brought negative with respect to the potential at terminal 78.

In unit 62, terminal 78 is connected to ring conductor 44 and hence the ring side of line 24 while terminal 79 is connected to tip conductor 42 and hence the tip side of line 24 as previously explained.

Figure 3:
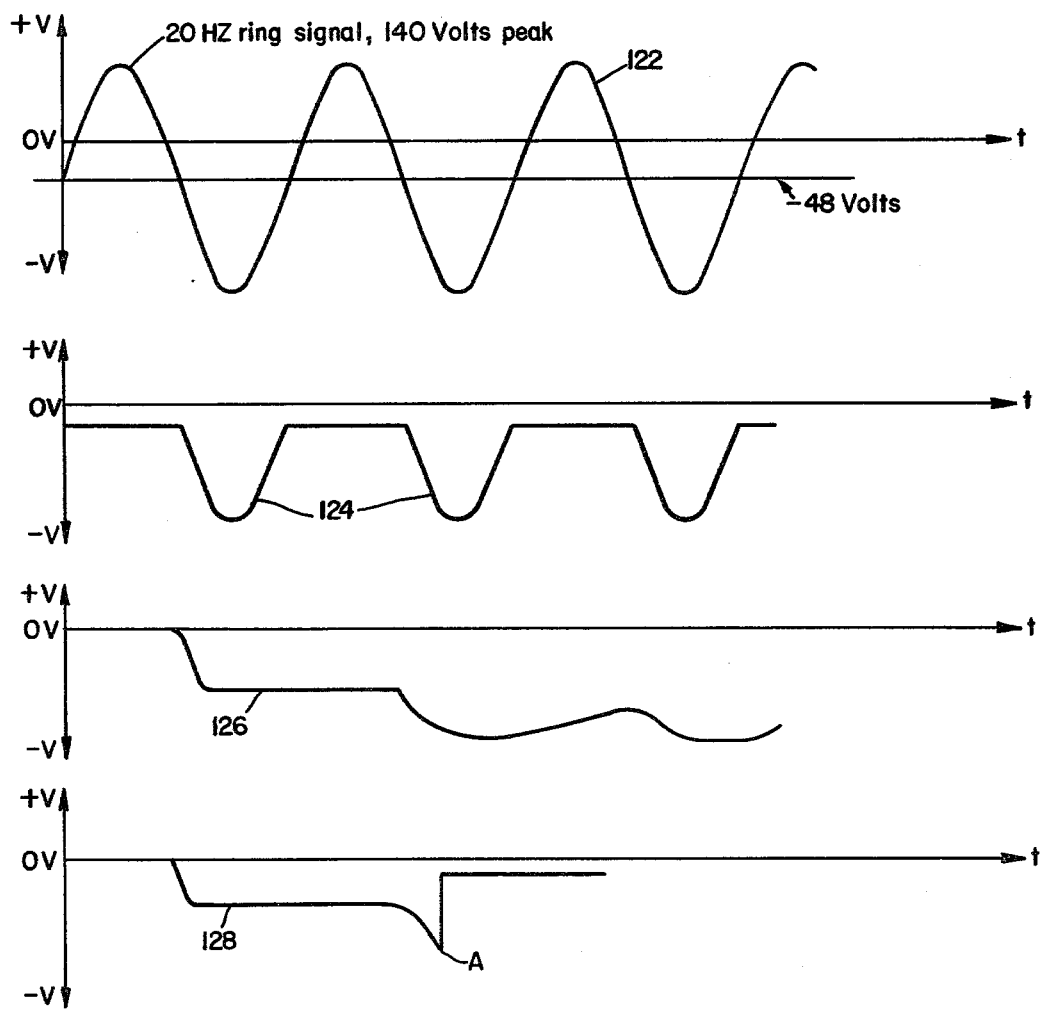
FIG. 3 is a timing diagrahm for voltages developed in the ringer isolator circuit of FIG. 2.

When it is desired to ring the tip party's telephone set 34, the central office equipment grounds the ring conductor of line 24, applies the negative central office battery potential to the tip conductor of line 24, and superimposes an a.c. ringing signal voltage (indicated at 122 in FIG. 3) on the negative central office battery potential at the tip side of line 24. This is typically accomplished by connecting the central office ring generator (not shown) in series with the central office battery between the negative side of the battery and the tip conductor of line 24 at the central office. The ringing signal typically has a frequency of 20 Hz and a peak voltage of 140 volts (80 to 100 volts rms).

For the above example of central battery voltage, the d.c. voltage applied across terminals 78 and 79 will therefore be −48 volts, tip to ring, with −48 volts on terminal 79 to zero volts on terminal 78. Zener diode 104 will therefore be forward biased on the negative going alternations of the ringing signal voltage 122 and will become reverse biased and non-conducting when the positive going alternation of the ringing signal voltage becomes positive. The zener potential of diode 104 is selected to be high enough such that the positive portions of the ringing signal's positive going alternations do not reach the zener potential to cause the zener diode to conduct in the reverse direction.

Zener 104 therefore rectifies the incoming ringing signal to feed rectified current to capacitor 106 to charge the capacitor. The half wave rectified ringing signal voltage developed by diode 104 is indicated at 124 in FIG. 3 and appears across capacitor 106 and resistor 118.

Prior to applying the ringing signal to ring the tip party's telephone 34, capacitor 106 will, under normal conditions, be discharged. Therefore, most of the voltage drop due to the capacitor charging current will initially occur across resistor 118, but as capacitor 106 charges toward the applied potential, the voltage across capacitor 106 builds up and the voltage across resistor 118 decreases. The voltage across capacitor 106 is indicated at 126 in FIG. 3.

Capacitor 106 continues to charge until the voltage across the capacitor becomes high enough to fire the neon tube 108. The firing potential of the neon tube 108 is pre-selected at a value which is somewhat less than the voltage to which capacitor 106 can charge. One suitable firing potential for neon tube 108 is about 80 volts.

When the voltage across capacitor 106 rises above the firing potential of neon tube 108, tube 108 fires to complete a discharge path for capacitor 106 through resistor 120 and to thereby conduct current from the charge stored on capacitor 106.

Resistor 120 limits the current that is conducted through the neon bulb from capacitor 106. The voltage developed across bulb 108 is indicated at 128 in FIG. 3. The neon bulb fires at point A on the voltage waveform 128.

Upon firing, neon tube 108 will remain in conduction and will conduct current throughout the positive and negative alternations of the ringing signal 122. On the negative going alternations of ringing signal 122, line current from line 24 will be conducted through neon bulb 108 to keep the neon bulb in its conducting state while capacitor 106 is charging. On the positive alternations of the ringing signal, capacitor 106 discharges current which is conducted through bulb 108 to keep it in its conducting state.

The ringing signal 122 is conventionally interrupted and thus applied in bursts by the central office equipment so that it will have the usual ringing and silent intervals. In the ringing interval the 20 Hz ringing signal will be applied to line 24, and in the silent interval it will be removed.

Neon tube 108 will fire near the beginning of each ringing interval, will remain in conduction throughout the ringing interval and will become non-conductive after capacitor 106 discharges at the beginning of the ensuing silent interval. Neon tube 108 will therefore cycle on and off, being on or conducting in the ringing interval and being off or non-conducting for most of the silent interval.

When neon bulb 108 conducts it directs light onto resistor 112 to reduce resistance of resistor 112 to a negligible value and to thereby enable gate current to be fed to Triac 110 for turning the Triac on. Because of the cyclic operation of neon bulb 108, Triac 110 will also cyclically turn on and off during application of the ringing signal voltage, being on for the ringing signal's ringing interval and off for the ringing signal's silent interval. Triac 110 will turn off in the silent interval because capacitor 56 blocks the flow of direct current that would sustain conduction of Triac 110 in absence of gate current flow.

During the ringing interval, the 20 Hz ringing signal current will therefore be conducted through the d.c. blocking capacitor 56 and ringer 54 in the tip party's telephone set 34 to ring the ringer.

The zener potential of zener diode 104 is preferably selected to be somewhat greater than the maximum reverse bias potential that may be applied across terminals 78 and 79 during ringing for either two party ringing or four party superimposed ringing. For example, the zener potential of diode 104 may be about 200 volts for a central office battery supply of ±48 volts and the peak ringing signal voltage of 140 volts.

For the two party ringing arrangement shown in FIG. 1, the zener potential of diode 104 will therefore be greater than the maximum positive tip voltage that applied to terminal 79 during ringing. Diode 104 consequently will be reverse biased during the positive portions of the ringing signal's positive going alternations, but will not breakdown to allow capacitor 106 to discharge as previously explained.

From the foregoing description it is clear that ringer isolator 64 keeps ringer 54 disconnected from ground except during the time that the central office ringing signal 122 is applied to ring the tip party's telephone 34. As a result, any impedance imbalance that may be caused by connecting the telephone ringer or ringers to ground will not be present to cause objectionable noise currents to be transmitted along with any voice currents when the called and calling parties are interconnected. As is well known these noise currents may develop under conditions where the impedance to ground on the tip side of the transmission line is not equal to the impedence to ground on the ring side of the line. Such an impedance imbalance often occurs as a result of having more ringers connected to one side of the line than the other.

In addition to rectifying an incoming ringing signal, zener diode 104 also protects neon tube 108 and the single capacitor 106 against damage due to power or voltage faults. Such faults may result from lightning. Lightning may result in the application of 60 Hz, 500 peak fault voltage across the tip and ring conductors of line 24 and hence across terminals 78 and 79 of ringer isolator 64.

Diode 104 will be forward biased by the positive alternations of the 60 Hz fault voltage so that capacitor 106 will tend to charge to the 500 peak voltage of the fault voltage. However, resistor 118 and capacitor are 106 preferably sized to provide a time constant that is significantly greater than one half of the time period of 60 Hz. For example, the time constant for resistor 118 and capacitor 106 may be selected to be about 25 ms. Since one-half the time period of 60 Hz is only about 8.1 ms, capacitor 106 will only tend to charge to about 150 volts in one 25 ms time constant on the initial positive alternation of the 60 Hz fault voltage. On the negative alternation of the fault voltage zener diode 104 will break down and conduct in the reverse direction due to the −500 Volt peak. This keeps the negative alternation of the voltage across capacitor 106 down to about 70 V. As a result zener diode 104 provides protection on negative alternations of the fault voltage, while the relatively long time constant of capacitor 106 and resistor 118 provides the protection of the fault voltage's positive alternations.

As shown in FIG. 2, ringer isolator 64 may advantageously be equipped with a second zener diode 132 to provide a high voltage option. This high voltage option is used with central offices which supply elevated or boosted battery voltage as in the case of ring trip battery systems. As shown the cathode of zener diode 132 is connected to an auxiliary high voltage terminal 132, and the anode of diodes 104 and 132 are connected back-to-back in series between terminal 134 and resistor 118. The zener potential of diode 132 is pre-selected at some suitable value (e.g., 51 volts) depending upon the elevated central office battery voltage.

To use this high voltage option for the tip party, terminal 134 is connected to the ring conductor of drop 36 in place of terminal 78. Thus, when the ring conductor 44 is grounded at zero volts and negative elevated voltage is applied to terminal 79 for ringing the tip party's telephone, zener diode 132 will be reversed biased beyond its zener potential. Diode 132 will therefore breakdown to conduct capacitor-charging current and provides a threshold that reduces the voltage measured across terminal 79 and the anode of diode 104. The zener potential of diode 132 may be selected to somewhat larger than the difference between the elevated central office battery voltage and the normal, lower central office battery supply of 48 volts. As a result, the voltage across terminal 79 and the anode of diode 104 will be reduced to a value that is less than the original 48 volts potential.

In order to ring the ring party's telephone 38, the central office operates to ground the tip conductor of line 24, to apply negative battery potential to the ring conductor of line 24, and to superimpose the 20 Hz ringing signal voltage on the negative battery potential at the ring conductor of line 24. This voltage condition for ringing for ring party's telephone 38 will not ring the tip party's telephone because diode 104 will be reverse biased below its breakdown level. As a result, diode 104 presents an open circuit to prevent capacitor 106 from being charged.

Referring back to FIG. 1, ringer isolator 64a is the same as ringer isolator 64 as previously mentioned. However, the circuit connection of the terminals 78a and 79a to drop 40 are reversed from the connections of terminals 78 and 79 to drop 36.

In the case of ringer isolator 64a, terminal 78a is connected to tip conductor 46, and terminal 79a is connected to ring conductor 48. Additionally, ringer 54a and capacitor 56a are connected between the grounding terminal 80a and the ring conductor 48 of drop 40 in order to provide the potential for ringing the ring party's ringer 54a.

From the foregoing it is clear that when the central office operates to ring the ring party's telephone 38, ground will be applied to terminal 78a and −48 volts with the superimposed ringing signal voltage will be applied to terminal 79a. The voltage applied to terminals 78a and 79a for ringing the ring party's telephone will therefore be the same as the voltages applied to terminals 78 and 79 for ringing the tip party's telephone. Ringer isolator 64a will therefore operate in the same manner as ringer isolator 64 to connect ringer 54a to ground for energizing the ring party's ringer. Ring isolator 64a will not respond to the central office voltage for ringing the tip party because the zener diode (corresponding to diode 104 in ringer isolator 64) will be reverse biased by polarity of the voltages that the central office applies to ring the tip party's telephone.

As compared with the previously described prior art ringer isolators, it will be appreciated that the ringer isolator of this invention has relatively few parts and only a single capacitor of relatively small size. The ringer isolator of this invention can therefore be packaged in a small container and is economical to manufacture. Furthermore it provides the unique high voltage option as previously explained and affords protection for the capacitor 106 against fault voltages to permit the reduced capacitor size to be used.

Finally, the ringer isolator of this invention is compatible with most types of ringing and, being polarity sensitive, may be used with multi-party superimposed ringing.

Figure 4:
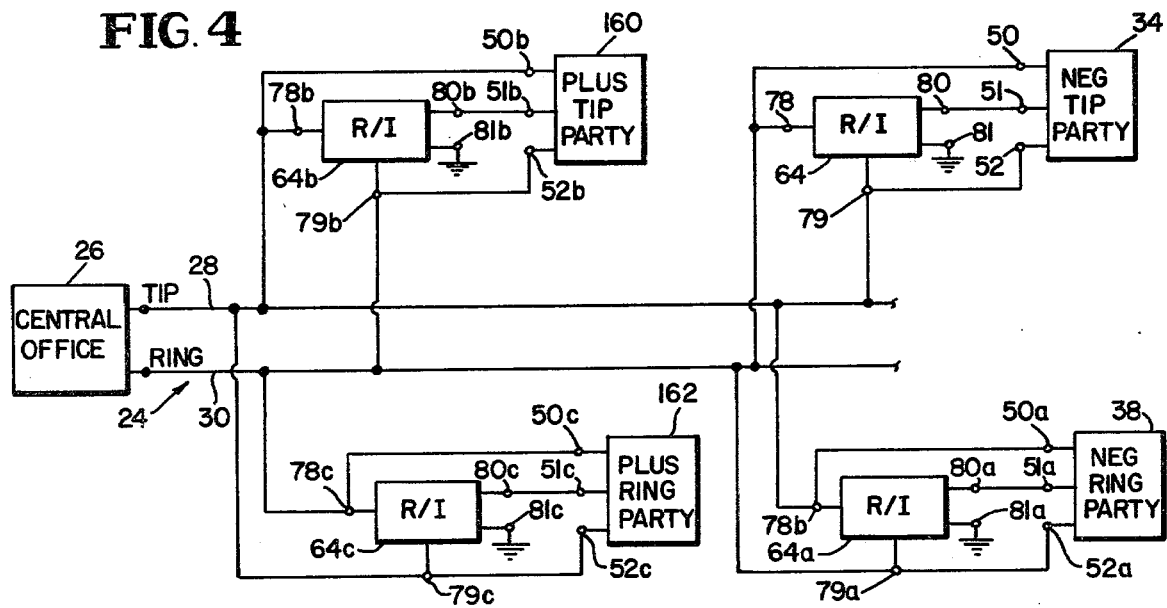
FIG. 4 is a schematic diagrahm showing the use of the ringer isolator of this invention in a four-party superimposed ringing scheme.

In FIG. 4, a four party ringing arrangement is shown using the ringer isolator illustrated in FIG. 2. The four parties are respectively designated as the negative tip party, the negative ring party, the positive tip party and the positive ring party. The arrangement and connections for the negative tip party is the same as that just described for the tip party in the two party arrangement shown in FIG. 1. Accordingly like reference numerals have been applied to designate the components for these two parties.

Also, the arrangement and connection for the negative ring party is the same as that just described for the ring party in the two party system shown in FIG. 1. Like reference characters have therefore been applied to designate the components for these two parties.

The telephone sets for the plus tip party and the plus ring party are indicated at 160 and 162, respectively. The ringer isolators for the plus tip party and the plus ring party are indicated at 64b and 64c. The terminals of ringer isolator 64b and telephone set 160 which correspond to terminals 50-52 and 78-81 have been designated by the same reference numbers suffixed with the letter b. Similarly, the terminals of telephone set 162 and ringer isolator 64c which correspond to terminals 50-52 and 78-81 have been designated by the same reference numbers suffixed by the letter c.

Ringer isolator 64 operates to ring the negative tip party's telephone 34 in response to the same central office d.c. and ringing voltages used to ring the tip party in the two party arrangement shown in FIG. 1. Ringer isolator 64a similarly operates to ring the negative ring party's telephone 38 in response to the same central office d.c. and ringing voltages used to ring the ring party in the two party system shown in FIG. 1.

Ringer isolator 64b operates to ring the plus tip party's telephones 160 when the ring side of line 24 is grounded and the 20 Hz ringing signal is superimposed on the positive central office battery potential (e.g., +48 volts) and applied to the tip conductor of line 24. Ringer isolator 64c operates to ring the plus ring party's telephone 162 when the tip conductor of line 24 is grounded and the 20 Hz ringing signal is superimposed on the positive central office battery potential and applied to the ring conductor of line 24.

It will be noted that the positive going alternations of the negative tip party's ringing signal voltage will swing positive by about 90 volts. The positive going alternations of the negative ring party's ringing signal voltage also swings positive by the same amount. The time constant of resistor 118 and capacitor 106 in each ringer isolator, however, is made long enough to prevent these positive voltage peak portions from charging the capacitor 106 up to the neon bulb's firing potential in ringer isolators 64b and 64c. As a result, the negative tip party's ringing signal will not cause ringer isolator 64b to ring the plus tip party's telephone, and the negative ring party's ringing signal will not cause the ringer isolator 64c to ring the plus ring party's telephone.

Figure 5:
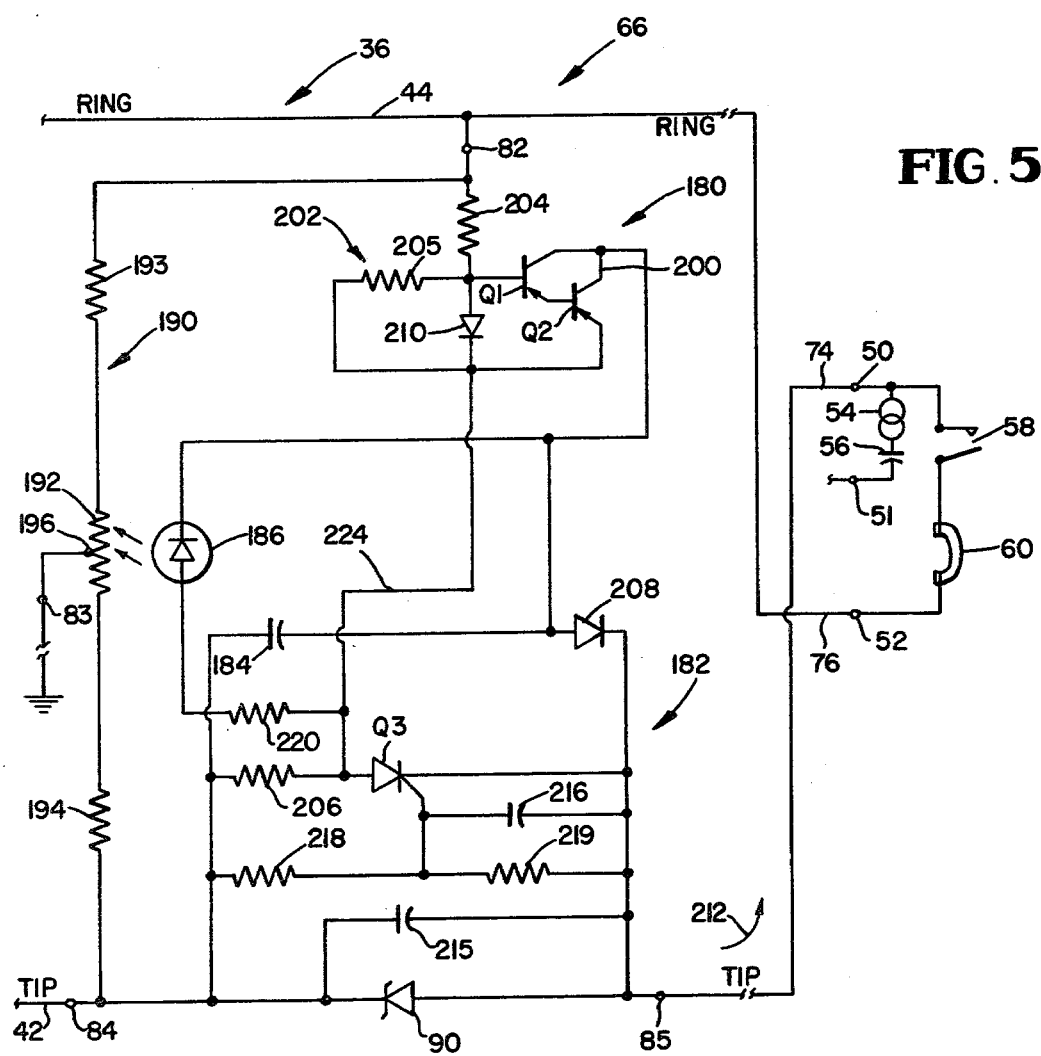
FIG. 5 is a schematic circuit diagrahm of the ANI mark circuit shown in FIG. 1.

Referring to FIG. 5, the ANI mark circuit 66 (also called the tip party station identification circuit) is shown to mainly comprise a ground mark squelch circuit 180, and a ground mark switching circuit 182. Briefly, the squelch circuit 180 is responsive to loop current flow when the tip party's telephone 34 is lifted off-hook to enable circuit 182 to charge a capacitor 184. When the central office lifts loop current off line 24 (i.e., interrupts loop current) to interrogate the two-party subscriber loop circuit for the presence of a ground mark (i.e., the establishment of a current path to ground), circuit 182 operates to discharge capacitor 184. The current discharged from capacitor 184 operates a device (in this case a light emitting diode 186) which causes a ground mark to be applied to the tip party's drop 36.

The ANI equipment in the central office senses the application of the ground mark (i.e., the ground current path) to identify the calling party as the tip party and to provide the operation for billing the call to the tip party in the event that the dialed call is a toll call.

Since the ring party has no ANI mark circuit, no ground mark will be applied to the ring party's subscriber drop or loop circuit when the ring party comes off-hook to initiate a call. Thus, when the central office equipment initiates a toll ticketing condition by lifting the loop current off line 24, no ground mark will be sensed by the ANI equipment in the case where the ring party is making the call. As a result the ANI equipment will identify the party making the call as the ring party and will operate to bill the ring party in the event that the call is a toll call. In this manner the party dialing the toll call will be identified for billing purposes.

Referring now in greater detail to FIG. 5, the ground mark switching circuit 182 is shown to comprise a ground mark resistance network 190 which provides the ground mark (the current path to ground) and which is connected between terminals 82 and 84. Network 190 is therefore connected across and bridges the tip and ring conductors of the tip party's drop 36.

As shown, network 190 comprises a light sensitive resistor 192 and two resistors 193 and 194 of equal fixed resistances. Resistors 192-194 are connected in series between terminals 82 and 84, with resistor 192 being connected between resistors 193 and 194 as shown.

Still referring to FIG. 5, resistor 192 is provided with a center tap 196 which is connected through terminal 83 to earth ground. By this arrangement the resistance between center tap 196 and one end of network 190 at terminal 82 is equal to the resistance between tap 196 and the other end of network 190 at terminal 84. The resistance in the network's tip-to-ground resistance path is therefore equal to the resistance in the network's ring-to-ground resistance path. By this balanced ground mark impedance arrangement no imbalance is introduced into the line during the application of the ground mark.

When the light emitting diode 186 is in its inert, non-conducting state, it will not emit light. The resistance of resistor 192 is therefore very large to effectively open the circuit between resistor 193 and ground and between resistor 194 and ground. The tip and ring conductors of the tip party's drop 36 will therefore be electrically disconnected from the earth ground at terminal 83. Under this condition the ground mark will be removed.

When the light emitting diode 186 conducts current it will emit light which reduces the resistance of resistor 192 to a negligible value. This establishes two resistive current conducting paths of equal resistances to ground, one between the tip conductor 42 and ground and the other between ring conductor 44 and ground. Under this condition the ground mark is applied, and may be sensed at the central office in a manner to be described in greater detail later.

As shown in FIG. 5, the squelch circuit 180 comprises a Darlington 200 and a voltage divider network 202 for biasing Darlington 200. Network 202 comprises resistors 204, 205 and 206. Resistors 204-206 are connected in series between terminals 82 and 84 and hence between the ring and tip conductors of the tip party's drop 36.

The junction between resistors 204 and 205 is connected to the base of the Darlington's input transistor Q1, and the junction between resistors 205 and 206 is connected to the Darlington's output transistor Q2 to provide the bias for the Darlington. The base of transistor Q1 is connected through a further diode 210 to the emitter of transistor Q2 to apply 0.7 volt bias across the base of Q1 and the emitter of Q2.

The circuit design for voltage divider 202 and Darlington 200 is such that Darlington 200 will not turn on until a negative voltage applied across the tip and ring conductors 42 and 44 is equal to or greater than a preselected threshold such as, for example, about −15 volts. Darlington 200 will therefore be forward biased when the central office grounds tip conductor 42 and places the negative battery potential of −48 volts on ring conductor 44. However, Darlington 200 will not be forward biased and will therefore be turned off when the tip party's telephone 34 is lifted off-hook to reduce the voltage across the tip and ring conductors 42 and 44 to some low value ranging from about −6 volts to −10 volts.

As shown capacitor 184 and diode 208 are connected in series across terminals 84 and 85. Diode 208 is so poled that its anode is connected to one plate of capacitor 208 and its cathode is connected to terminal 85. The interconnected collectors of Darlington 200 are connected to the junction between capacitor 184 and diode 208.

From the foregoing circuit description it will be appreciated that the current conducting path of resistor 206 and the collector-emitter of transistor Q2 is connected across capacitor 184. Resistor 206 is relatively small being on the order of about 100 to 150Ω, so that the Darlington's collector-emitter current flow through resistor 206 will result in only a very small drop across resistor 206. The voltage across the collector emitter of transistor Q2 will also be small when Darlington 200 conducts.

When Darlington 200 is forward biased it will therefore establish a virtual short (indicated at 224 in FIG. 5) across capacitor 184 to keep the capacitor discharged. This current conducting short across capacitor 184 is established through resistor 206 and the collector-emitter of transistor Q2. If capacitor 184 is charged when Darlington 200 is turned on, it will discharge through resistor 206 and the emitter-collector path of transistor Q2.

When Darlington 200 is in its non-conducting state, no collector current is conducted with the result that the voltage across the collector-emitter electrodes of transistor Q2 will rise to the voltage across the tip and ring conductors 42 and 44. Accordingly, the short 224 across capacitor 184 will be removed permitting capacitor 184 to be charged when Darlington 200 is switched to its non-conducting state.

As shown, zener diode 90 has its cathode connected to terminal 84 and its anode connected to terminal 85 so that it is reverse biased by normal loop current flow which is counterclockwise as indicated by the arrow 212 in FIG. 5. Zener diode 90 is in parallel with the series combination of capacitor 184 and 208. As will become apparent from the following description, diode 90 is the only component serially connected in the tip party's subscriber loop or line which is formed by line 24 and drop 36.

In addition to the components already mentioned, switching circuit 182 comprises an SCR (a silicon controlled rectifier) Q3, capacitors 215 and 216 and resistors 218, 219 and 220.

As shown, resistor 206 and SCR Q3 are connected in series between terminals 84 and 85 in parallel with zener diode 90 and in parallel with the series combination of capacitor 184 and diode 208. Resistors 218 and 219 are connected in series between terminals 84 and 85 in parallel with the series combination of resistor 206 and SCR Q3 to define a voltage divider for driving the gate of SCR Q3.

As shown the junction between resistors 218 and 219 is connected to the gate of SCR Q3. Capacitor 216 is connected between the gate of SCR Q3 and terminal 85 in parallel with resistor 219 and in series with resistor 218. Capacitor 215 is connected across zener diode 90 between terminals 84 and 85 and provides an a.c. shunt around diode 90 for the voice signals.

The current path for feeding current through the light emitting diode 186, which is light coupled to resistor 192, is through terminal 84, resistor 206, resistor 220, the light emitting diode itself, diode 208 and terminal 85. Resistors 206 and 220 and diodes 186 and 208 are all connected in series between terminals 84 and 85 as shown.

When the telephone line is in its idle state with telephone 34 on hook, no loop current will flow through the tip party's subscriber drop 36, ring side of the line at 44 will be at the negative central office battery potential of −48 volts, and the tip side of the line at 42 will be at ground potential or zero volts. For this tip to ring voltage condition, current will be conducted through voltage divider 202 from the tip conductor 42 to the ring conductor 44 to forward bias Darlington 200. As a result, Darlington 200 will establish the short 224 across capacitor 184. Capacitor 184 will therefore be discharged in the above-mentioned idle state of the line.

In this idle state, no current will be conducted through the light emitting diode 186 because no charge is available on capacitor 184. Additionally, SCR Q3 will be turned off because of the lack of gate current, and capacitors 215 and 216 will not be charged because of the absence of current flow through the tip conductor 42.

When the tip party's telephone 34 is lifted off-hook to dial a call, hook switch 58 closes to complete the operating loop circuit. Loop current will therefore flow in line 24 and drop 36 and through the telephone set which presents a relatively low resistance (e.g., 200Ω). As a result, the voltage on the ring conductor 44 will drop to a relatively small negative value ranging from about −6 volts to −10 volts. Because of this reduction in voltage across the tip and ring conductors 42 and 44, Darlington 200 will turn off or become non-conducting as previously explained to open the shorting circuit 224 that was shunted around capacitor 184.

With hook switch 58 closed to establish loop current flow and with Darlington 200 now in its non-conducting state, capacitors 184, 215, 216 will begin charging. Capacitors 184 will be charged by loop current through diode 208 which at this time is forward biased. Capacitor 216 will be charged by loop current through resistor 218, and capacitor 215 will be charged by loop current flowing in through terminal 84 and out through terminal 85.

The left hand plates of capacitors 184 and 215 will therefore become positive while right hand plates of capacitors 184 and 215 become negative. The voltage across capacitors 184 and 214 will therefore back bias zener diode 90 as the capacitors charge. The zener potential of zener diode 90 is selected at some relative low value such as approximately 5 volts.

Capacitors 184 and 215 charge relatively quickly because of the lack of resistances present in the charging paths in switching circuit 182. The time constant for capacitor 216, however, will be much slower because resistor 218 is relatively large.

Because of the relatively short time constant for capacitors 184 and 215 the voltage across the capacitors will rapidly build up to the zener potential of zener diode 90. When this happens, diode 90 breaks down to limit the voltages across capacitors 184 and 215. Thereafter, the voltage on capacitor 216 builds up sufficiently to reach the firing potential (about 0.8 volts) for SCR Q3. SCR Q3 will therefore fire to conduct loop current through resistor 206.

Because of the very small resistance of resistor 206, virtually all of the loop current will be conducted through resistor 206 and SCR Q3 when SCR Q3 turns on. As a result the voltage drop across terminals 84 and 85 will be reduced to a very low value that is insufficient to cause diode 208 to conduct. Diode 208 therefore stops conducting to open the charging circuit for capacitor 184. In addition, the very low voltage drop which is created across the circuit by conduction of SCR Q3 is small enough to keep the current flow from capacitor 184 through diode 186 to a low value that is below the current threshold needed to illuminate diode 186. As long as SCR Q3 remains in conduction, therefore, it will prevent capacitor 184 from discharging sufficient current to illuminate the light emitting diode 186. Diode 208 is poled to prevent capacitor 184 from discharging through SCR Q3 when SCR Q3 is turned on. Up to this time, therefore, diode 186 will not emit light so that resistor 192 will be at its high open-circuit value to prevent the ground mark from being applied.

From the description thus far it will be appreciated that very shortly after lifting the tip party's telephone 34 off-hook, a charge will be stored on capacitor 184 and will be held there by the conduction of SCR Q3. It will be noted that the circuit design is such that the only current available for illuminating diode 186 is from the charge stored on capacitor 184. Until capacitor 184 discharges through resistors 206 and 220, therefore, light emitting diode 186 will be off and the ground mark will be removed.

Capacitor 184 will be charged to the maximum value set by the zener potential of diode 90 before the central office equipment interrupts loop current to initiate a toll ticketing condition.

In a typical crossbar central office switching system, the following sequence usually takes place to establish a toll ticketing condition after either one of the parties comes off-hook and before dial tone is supplied to the off-hook party. First, the central office equipment will momentarily interrupt the loop current shortly after the party's telephone is lifted off hook; shortly after, and while the loop current is still interrupted, the tip and ring conductors of line 24 are momentarily shorted together and the negative battery potential of −48 volts is applied by the central office to the interconnected tip and ring conductors. In some offices the central office will allow the ring conductor of line 24 to float and will apply the negative battery potential to tip conductor instead of shorting the tip and ring conductors of line 24 together and applying the negative battery potential to both conductors. The ANI mark circuit 66 works for both types of offices.

The time constants in the ANI mark circuit are such that capacitor 184 will be charged to the maximum permitted value and SCR Q3 will be turned on in the time interval between the moment the calling party's telephone is lifted off-hook to cause loop current to flow and the moment the central office lifts the loop current off line 24 to initiate the sequence described above.

As soon as the central office interrupts the loop current in this sequence, capacitor 216 will begin to rapidly discharge through the gate of SCR Q3, and when capacitor 216 completes discharging, SCR Q3 will return to its non-conducting state to allow capacitor 184 to discharge current through the light emitting diode 186. This current discharge path for the charge stored on capacitor 184 may be traced from the left hand plate of capacitor 184 which is charged at positive potential, through resistor 220 and through diode 184 to the capacitor's right hand plate which is negative.

Almost as soon as loop current is interrupted by the central office, diode 186 will emit light to reduce the resistance of resistor 192 to its current-conducting value for applying the ground mark as previously described. The capacitor discharge time constants are such that SCR Q3 will turn off and capacitor 184 will begin to discharge before the central office shorts the tip and ring conductors together and applies the negative battery potential. The ground mark will therefore be present at the time when the central office shorts the tip and ring conductors of line 24 together and applies the negative battery potential to the shorted conductors.

Assuming that the ground mark has been applied, the central office will therefore sense the resulting current path to ground when it shorts the tip and ring conductors of line 24 together and applies the negative battery potential to the line. Upon reducing resistor 192 to its current conducting value it is apparent that a mark is established between the tip conductor 42 and ground and also between the ring conductor 44 and ground.

After shorting the tip and ring conductors of line 24 together and applying the negative battery potential to sense whether or not a ground mark has been applied, the central office crossbar system restores loop current to the calling party's subscriber loop and supplies the dialing tone to the calling party to permit the calling party to commence dialing. If the central office sensed a ground mark during the toll ticketing condition, it identifies the calling party as the tip party. If the central office fails to sense a ground mark, it identifies the calling party as the ring party. After the dial pulsing is completed the central office transmits the identity of the calling party to the CAMA (Centralized Automatic Message Accounting) equipment to provide for the billing of the toll call, if one was made, to the identified party.

The discharge time constant for capacitor 184 is made relatively long by virtue of the relatively large resistance in the capacitor's discharge circuit. Preferably, the discharge time constant is made greater than 300 Msec to be sure that the ground mark is applied long enough to be sensed by the central office.

When loop current is restored to the tip party's loop circuit after its momentary removal to enable the central office equipment to check for the presence or absence of a ground mark, Darlington 200 will remain in its non-conducting state and SCR Q3 will turn on again to prevent capacitor 184 from continuing to discharge. Circuit 66 will remain in this state throughout the remainder of the call unless there is a battery reversal at the time the calling and called parties are connected to discharge capacitor 184 again. In any case, any remaining charge will be held on capacitor 184 until the tip party hangs up because SCR Q3 will be in its conductive state for this time.

As soon as the tip party returns telephone 34 to its on-hook state, Darlington 200 will again be forward biased to re-establish the short 224 for rapidly discharging capacitor 184. In this way the ground mark will quickly be squelched and will not appear on the line after the tip party hangs up to give rise to a possible false billing situation where the ring party comes off-hook shortly after the tip party hangs up and makes a toll call.

When the subscriber loop circuit is opened by dialing, loop current will be interrupted, and the voltage on ring conductor 44 will increase negatively to about −48 volts, Because of the charge stored on capacitor 216, gate current will continue to be conducted to SCR Q3 to keep SCR Q3 turned on during the intervals of the open loop dialing pulses. This prevents current from being discharged by capacitor 184 through diode 186. In this way the mark will not be applied during the transmittal of the open loop dialing pulses to advantageously avoid the dialing pulse distortion that would otherwise occur if the ground mark were left on during dialing.

With circuit 66 it will be appreciated that in order to apply the ground mark capacitor 184 must first be charged and SCR Q3, after being turned on, must then be turned off in response to the interruption of loop current.

From the foregoing description of circuit 66 it will be appreciated that the only component in the tip party's loop circuit is diode 90, and this component is shunted by capacitor 215 which is of relatively large size. As a result, practically no insertion or line loss is introduced into the tip party's subscriber line or loop. Additionally virtually no imbalance is introduced into the tip party's line both when the ground mark is removed and applied. Furthermore, circuit 66 may be used with bridged or grounded ringing systems, can serve all of the telephones at the subscriber's location, provides an electrically-timed switch to remove the mark upon the resumption of loop current and employes light coupled solid state circuitry (diode 186 and resistor 192) which affords excellent isolation between the tip conductor and ground and between the ring conductor and ground.

It will be appreciated that if the ring party's telephone 38 is lifted off-hook to dial a call, rather than the tip party's telephone, loop current will flow in the ring party's drop 40 by virtue of closing the hook switch 58a. Because of the resulting decrease in voltage across the tip and ring conductors of line 24, Darlington 200 will turn off to open the short 224 around capacitor 184. Capacitor 184, however, will not charge because no loop current is flowing in the tip party's drop 36. No loop current flows in the tip party's drop 36 because hook switch 58 is open. Since no charge is accumulated in capacitor 184, there is no current available for illuminating the light emitting diode 186 when the central office interrupts the loop current to initiate the sequence for sensing the presence or absence of a ground mark.

As a result the ground mark will not be applied by circuit 66 so that when the central office interrupts the loop current, it will not sense a ground mark or, more particularly, a current path to ground. As a result the calling party will be identified by the central office as the ring party for billing the toll call if one is made.

Figure 6:
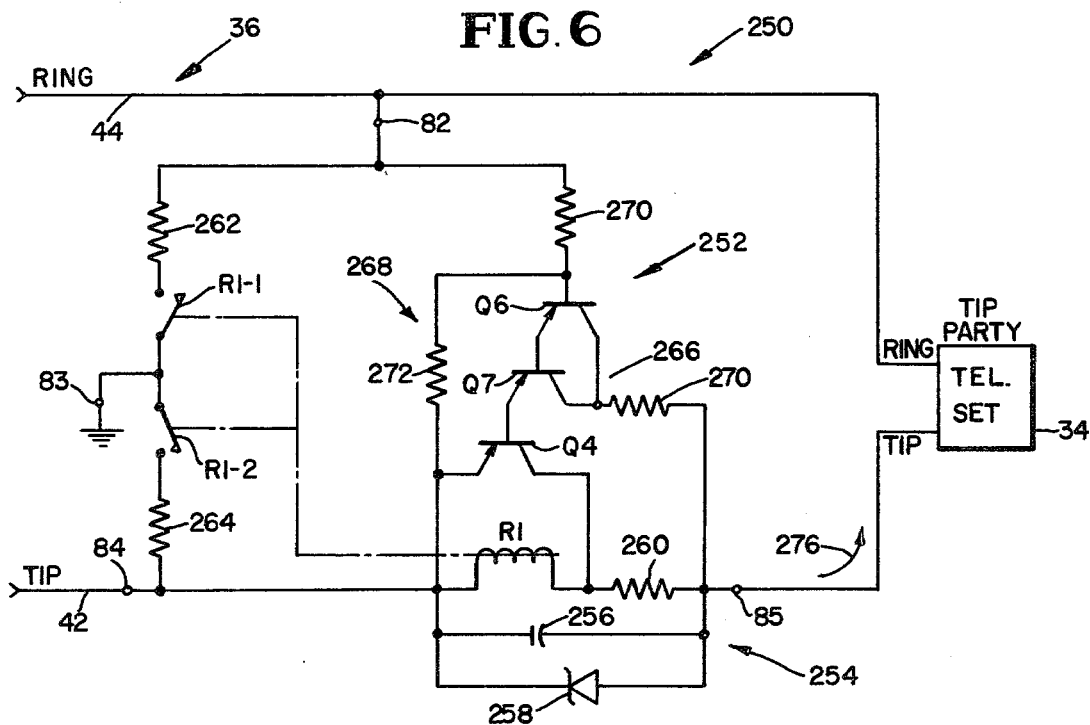
FIG. 6 is a schematic diagrahm of another embodiment of an ANI mark circuit according to this invention.

In FIG. 6 the modified ANI mark circuit for the tip party is generally indicated at 250 and comprises a ground mark squelch circuit 252 and a ground mark switching control circuit 254. Control circuit 254 mainly comprises a relay R1, a capacitor 256 and a zener diode 258. The winding of relay R1 and a small resistor 260 are connected in series between terminals 84 and 85 and hence in series with the tip party's tip conductor 42 as shown. Capacitor 256 is connected across terminals 84 and 85 in parallel with the relay winding and resistor 260.

Zener diode 258 is connected across capacitor 256. Diode 258 is poled to be reverse biased by charging capacitor 256 to limit the voltage across capacitor 256 to its zener potential. The zener potential of diode 258 is pre-selected and may be about the same as that for diode 90.

As shown relay R1 has a pair of normally open contacts R1-1 and R1-2. Contacts R1-1 and R1-2 and a pair of equally sized resistors 262 and 264 are connected in series across the tip and ring conductors 42 and 44 of the tip party's subscriber drop 36. Contacts R1-1 and R1-2 are connected between resistors 262 and 264 as shown, and the earth grounded terminal 83 is connected to the junction between contacts R1-1 and R1-2.

The squelch circuit 252 comprises a Darlington 266, a PNP transistor Q4 and a voltage divider network 268 for biasing the Darlington. Network 268 consists of a pair of resistors 270 and 272 connected in series between terminals 82 and 84 and hence across the tip and ring conductors 42 and 44.

The junction of resistors 270 and 272 is connected to the base of the Darlington's transistor Q6 to provide the base bias for transistor Q6. The interconnected collector electrodes of Darlington 266 are connected through a resistor 272 to terminal 85 and hence to the tip side of telephone 34 as shown. The emitter of the Darlington's transistor Q7 is connected to the base of transistor Q4.

The emitter of transistor Q4, in turn, is connected to the left hand terminal of the winding for relay R1 and terminal 85, while the collector of transistor Q4 is connected to the relay winding's ring hand terminal between the winding and resistor 260. The emitter and collector electrodes of transistor Q4 are therefore connected across the winding for relay R1 to establish a short circuit across the winding when transistor Q4 is turned on and driven into or near the saturation to minimize its collector-emitter voltage.

Darlington 266 controls the conduction of transistor Q4, and the bias for Darlington 266 is established by voltage divider 268 and the central office battery voltage across the tip and ring conductors 42 and 44 of the tip party's subscriber drop 36. The values of the resistors in voltage divider 268 are so selected that Darlington 266 will be forward biased to turn on only when the voltage across the tip and ring conductors 42 and 44 exceeds a pre-selected threshold and the voltage on the tip side is positive with respect to the voltage on the ring side. This threshold is less than the tip-to-ring voltage present in the idle state of the line, but greater than the voltage that appears across the tip and ring conductors 42 and 44 when telephone 34 is lifted off-hook to cause loop current to flow. For example the threshold may be a suitable value in the range extending from about 15 volts to about 20 volts.

In the idle state of the line when the tip party's telephone 34 is on-hook to open the tip party's loop circuit, the tip conductor 42 will be at ground potential (0 volts), and the ring conductor will be at the negative central office battery voltage (−48 volts) as previously mentioned. Under this condition, voltage divider 268 supplies a biasing voltage to the base of transistor Q6 which is high enough to turn Darlington 266 on. As a result, the base of transistor Q4 will be pulled negative with respect to its emitter voltage to cause transistor Q4 to conduct and to preferably drive it into saturation so that its collector-emitter voltage will reduce to a small value. A short circuit will therefore be applied across the winding of relay R1 to prevent the relay from energizing.

With relay R1 de-energized, contacts R1-1 and R1-2 will be open to disconnect the earth grounded terminal 83 from the tip and ring conductors 42 and 44 to thereby remove the ground mark from both conductors.

During the idle state mentioned above, capacitor 256 will be in its discharged state and cannot be charged because no loop current is flowing in the tip party's drop 36 at this time.

When the tip party's telephone 34 is lifted off-hook to initiate a call, loop current will flow in the direction of the arrow 276. The voltage across the tip and ring conductors 42 and 44 will therefore drop to a low value (e.g., 6 volts to 10 volts). As a result, Darlington 266 will turn off. When Darlington 266 turns off, transistor Q4 will turn off or become non-conductive to open the short circuit across the winding of relay R1. Relay R1, however, will not energize immediately because capacitor 256, being in its discharged state, will create a short across the relay winding and resistor 260.

A short time after telephone 34 is lifted off hook, capacitor 256 will be charged sufficiently to allow loop current to flow through the circuit branch containing the winding of relay R1 and resistor 260 to energize the relay. Contacts R1-1 and R1-2 will therefore close while the loop current is flowing to apply the ground mark through equal resistances (i.e., resistors 262 and 264) to the tip and ring conductors 42 and 44 of the tip party's drop 36.

Capacitor 256 will be charged by the flow of loop current to the voltage that is set by the zener potential of zener diode 258. When the central office interrupts the flow of loop current to initiate the previously described sequence to check for the presence of a ground mark, capacitor 256 will discharge current through the winding of relay R1 to keep relay R1 energized for a sufficiently long time that is set by the time constant of capacitor 256 and resistor 260.

By keeping relay R1 energized, contacts R1-1 and R1-2 remain closed so that the ground mark will continue to be applied at the time when the central office shorts the tip and ring conductors of line 24 together and applies the negative central office battery potential to the shorted conductors to check for the presence of a ground mark.

When loop current is thereafter restored by the central office, relay R1 will be held in its energized state to keep the ground mark applied to the tip party's drop 36 up to the time of dialing. When the tip party's operating loop circuit is broken by dialing a number on telephone 34, the voltage on the tip and ring conductors 42 and 44 will be restored to their original idle state values (0 volts on tip and −48 volts on ring) for each break or open loop pulse.

Darlington 266 will therefore turn on for each break portion in the dialing pulse string, causing transistor Q4 to turn on and re-apply the short circuit across the winding of relay R1. For each dialing pulse break portion, therefore, relay R1 will be de-energized to open contacts R1-1 and R1-2 and to thereby remove the ground mark from the tip and ring conductors 42 and 44 throughout each dialing pulse break portion. If any charge is present on capacitor 256 at the beginning of each break portion, the capacitor will discharge through the emitter and collector of transistor Q4.

This rapid squelching operation avoids the dialing pulse distortion that could otherwise occur if the ground mark were not removed.

After dialing, relay R1 will again be energized and capacitor 256 will be re-charged by loop current flow. In this embodiment, therefore, the ground mark will therefore remain on the tip and ring conductors 42 and 44 until telephone 34 is placed on hook to open the subscriber loop circuit and thereby interrupt loop current flow.

When this happens, transistor Q4 will be switched on again by Darlington 266 to re-apply the short circuit across the winding of relay R1. The ground mark will therefore be removed as soon as the tip party's telephone 34 is placed on hook. The above ANI works for both differential and longitudinal systems.

Figure 7:
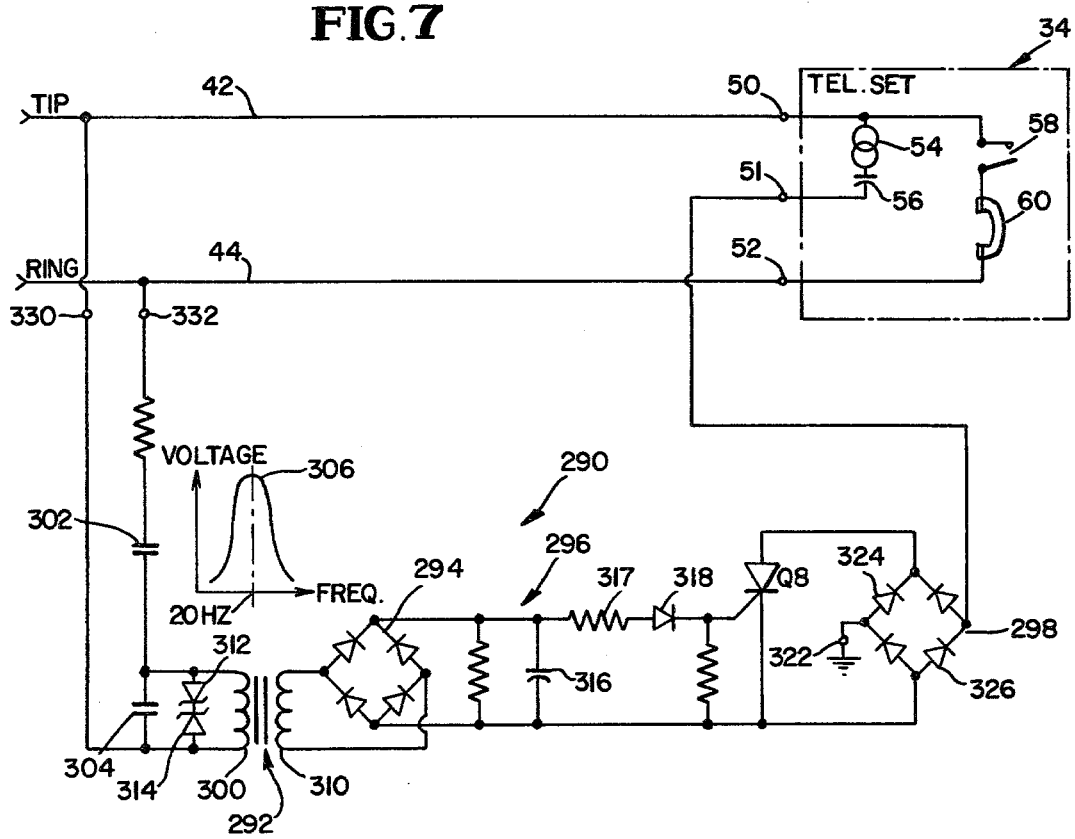
FIG. 7 is a schematic circuit diagrahm of another embodiment of the ring isolator circuit according to this invention.

In the embodiment shown in FIG. 7, the ringer isolator is generally indicated at 290 and is connected to telephone 34 and to the subscriber's drop 36. Ringer isolator 290 mainly comprises a transformer 292, a rectifier 294, a smoothing filter 296, an SCR switch Q8 and a diode bridge 298.

The primary inductor coil 300 of transformer 290 is a.c. coupled to the tip and ring conductors 42 and 44 by a coupling capacitor 302 so that when the central office a.c. ringing signal is applied to the line to ring telephone 34 it will be impressed across the primary coil 300. The primary of transformer 292 is tuned by the means of a further capacitor 304. Capacitor 304 is connected across the primary coil 300 to form a parallel resonant circuit which is designed to resonate at the frequency of the applied central office ringing signal which usually is 20Hz as previously mentioned. The frequency response curve for this resonant circuit is indicated at 306 in FIG. 7. As a result of this frequency selective arrangement only the 20Hz ringing signal will be coupled into the transformer's secondary coil 310 without attenuation, while signals at non-resonant frequencies will be attenuated.

As shown in FIG. 7, a pair of zener diodes 312 and 314 are connected in series, anode to anode, across the transformer's primary coil 300 to clip the positive and negative peaks of the 20Hz ringing signal that is coupled into the transformer's secondary.

The zener potentials of diodes 312 and 314 are equal and are selected at some suitable value such as 6 volts. In such a case the peak-to-peak voltage of the ringing signal in the secondary of transformer will be reduced to 12 volts.

Rectifier 294 is connected to the secondary coil of transformer 292 to provide full wave rectification of the clipped ringing signal. The rectified ringing signal is applied to filter 296 which comprises a capacitor 316 to smooth the full wave rectified waveform and to thereby produce a steady d.c. signal current which is conducted through a resistor 217 and a diode 218 to feed the gate of SCR Q8.

Still referring to FIG. 7, the anode and cathode electrodes of SCR Q8 are connected across one pair of opposite terminals of bridge 298. The third terminal of bridge 298 is connected to earth ground at 322 as shown, and the fourth terminal of the bridge is connected to terminal 51 on the telephone set 34.

The diodes in bridge 298 are poled in the manner shown so that when SCR Q8 is turned on the ringer 54 in telephone 34 will be connected to the earth ground 322 to complete a circuit for ringing the ringer with the ringing signal that is applied to the line. This ringing circuit may be traced from ground 322, through diode 324 in bridge 298, through SCR Q8, through diode 326 in bridge 298, through terminal 51, through capacitor 56 and through ringer 54 to the tip side of the line at terminal 50.

When the 20Hz central office ringing signal voltage is applied across the input terminals 330 and 332 of ringer isolator 290, the clipped 20Hz signal will be coupled into the secondary of transformer 292 as previously explained to develop the direct current that is fed to the gate of SCR Q8 to turn the SCR on. When this happens the ringer 54 will be connected to ground to complete the previously described circuit for conducting the a.c. ringing signal current through ringer 54 to energize the ringer. SCR Q8 will remain on throughout the ringing interval of the ringing signal because gate curent is conducted to SCR Q8 throughout the ringing interval. When SCR Q8 turns off it opens the current-conducting circuit between ringer 54 and the earth ground connection 322 to keep the ringer disconnected from ground except for the time periods when the central office ringing signal voltage is applied to the line to ring telephone 34.

The tuned transformer primary 300 and the clipping circuit established by diodes 312 and 314 protects the components of ringer isolator 290 on the secondary side of transformer 292 against fault voltages. Fault voltages such as the previously mentioned 60Hz voltage will be attenuated significantly by the resonant circuit in the primary of transformer 292 by as much as −20 db to −40 db.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A station identification circuit for identifying a pre-selected one of two parties on a two-party line in a telephone system when a call is initiated from the pre-selected party's telephone, comprising: first means providing a ground mark which is normally disconnected from said line when said pre-selected party's telephone is on-hook, and second means responsive to the first momentary interruption of loop current that occurs after the flow of loop current is established by lifting the pre-selected party's telephone off-hook for causing said first means to apply the ground mark to at least the tip conductor of said line regardless of the presence or absence of negative central office battery voltage on the tip conductor.

2. The station identification circuit defined in claim 1 wherein said second means includes a circuit for preventing said first means from applying said ground mark to said tip conductor during the occurence of open loop dialing pulses that are transmitted from said selected party's telephone.

3. A station identification circuit for applying a ground mark to identify a pre-selected one of two parties on a two-party line in a telephone system when a call is initiated from the pre-selected party's telephone, comprising: a capacitor, means for charging said capacitor with loop current flowing in the pre-selected party's subscriber drop when the flow of loop current is initiated by lifting the pre-selected party's telephone off-hook to provide a charge on said capacitor before the first momentary interruption of loop current occurs, current-conducting means, means for discharging current from said capacitor through said current-conducting means when the first momentary interruption occurs in the loop current after the pre-selected party's telephone is lifted off-hook to initiate a call, and means under the control of said current-conducting means for applying the ground mark to at least the tip conductor of the line connecting said selected party's telephone to said central office whenever said capacitor discharges current through said current-conducting means.

4. The station identification circuit defined in claim 3 wherein said current-conducting means comprises a device that emits light when current is conducted through it, and wherein said means for applying said ground mark comprises a light sensitive resistor light coupled to said device to assume a low current-conducting resistance when said device emits light and a high current-blocking resistance when no light is emitted by said device, said light sensitive resistor being connected intermediate an earth grounded terminal and at least said tip conductor to apply said ground mark when it assumes its low current-conducting resistance and to remove said ground mark when it assumes its high current-blocking resistance.

5. The station identification circuit defined in claim 4 wherein said device is a light emitting diode.

6. The station identification circuit defined in claim 4 wherein said light sensitive resistor is connected through equal resistances to the tip and ring conductors of said preselected party's subscriber drop to form a resistance network in which said resistances and said resistor are all connected in series across the tip and ring conductors of said pre-selected party's subscriber drop, and wherein said earth grounded terminal is connected to a center tap on said resistor such that the tip and ring conductors of said pre-selected party's subscriber drop are connected through equal resistances to said terminal.

7. The station identification circuit defined in claim 3 wherein said means for enabling said capacitor to be charged comprises circuit means that normally applies a short circuit across said capacitor to discharge and prevent charging of said capacitor when said selected party's telephone is on-hook to prevent the flow of loop current in the pre-selected party's subscriber drop, said circuit means being responsive to the flow of loop current that is initiated by lifting said selected party's telephone off-hook to break said short circuit and to thereby allow said capacitor to be charged by said loop current.

8. The station identification circuit defined in claim 7 comprising a zener diode connected in series with the tip conductor of said pre-selected party's subscriber drop, said capacitor being connected across said zener diode in parallel therewith, and said zener diode being back biased by the charge stored on said capacitor to limit the voltage built across said capacitor to the zener potential of said zener diode.

9. The station identification circuit defined in claim 8 wherein said zener diode is the only component of the station identification circuit that is connected in series with one of the tip or ring conductors of said pre-selected party's subscriber drop, and wherein a further capacitor is connected across said zener diode to provide an a.c. path for bypassing voice signals around said zener diode.

10. The station identification circuit defined in claim 7 wherein said circuit means is connected across the tip and ring conductors of said pre-selected party's subscriber drop.

11. The station identification circuit defined in claim 10 wherein said circuit means comprises a plurality of transistors connected in a Darlington configuration, a biasing circuit connected to said Darlington configuration for forward biasing said transistors only when the central office battery voltage across the tip and ring conductors of said pre-selected party's subscriber drop is above a preselected threshold that is greater than the d.c. voltage that appears across the tip and ring conductors of said pre-selected party's subscriber drop when loop current is flowing in the pre-selected party's subscriber drop, and means connecting the emitter and collector electrodes of one of said transistors across said capacitor such that when said transistors are forward biased, said short circuit across said capacitor is established.

12. The station identification circuit defined in claim 3 including means for preventing said capacitor from discharging until the loop current is interrupted by said central office to initiate an operation for sensing the presence of the ground mark if it is applied.

13. The station identification circuit defined in claim 12 wherein said means for preventing said capacitor from discharging includes a current conducting device, and means cooperating with said current conducting device to prevent said capacitor from discharging current during the break portions of dialing pulses transmitted from said pre-selected party's telephone.

14. The station identification circuit defined in claim 3 wherein said current-conducting means comprises relay winding means and wherein said means under the control of said current-conducting means comprises a set of contacts operated by the flow of current through said winding means to complete a current conducting path between earth ground and at least the tip conductor of the pre-selected party's subscriber drop to establish said ground mark.

15. The station identification circuit defined in claim 14 wherein said winding means is connected in series with one of the tip and ring conductors of the pre-selected party's subscriber drop, and wherein said capacitor is connected in parallel with said winding means.

16. The station identification circuit defined in claim 14 comprising means for establishing a short circuit across said winding means to prevent current from being conducted therethrough whenever the d.c. voltage across the tip and ring conductors of said pre-selected party's subscriber drop is at a value that exists when the pre-selected party's telephone is on-hook, said short circuit establishing means being effective to open said short circuit to permit current to be conducted through said control means in response to the reduction that takes place in the d.c. voltage across the tip and ring conductors of the pre-selected party's subscriber drop when the pre-selected party's telephone is lifted off-hook to initiate the flow of loop current.

17. A station identification circuit for applying a ground mark to identify a pre-selected one of two parties on a two-party line in a telephone system when a call is initiated from the pre-selected party's telephone, comprising: a ground mark resistance network connected across and bridging the tip and ring conductors of said pre-selected party's subscriber drop and including a light sensitive resistor, a current-conducting light-emitting device for emitting light when it conducts current, said resistor being light coupled to said current-conducting device to assume a low current-conducting resistance when said device emits light and a high current-blocking resistance when said device does not emit light, said resistor being connected intermediate its ends to an earth grounded terminal to establish a mark between ground and each of the tip and ring conductors of the pre-selected party's subscriber drop when it assumes its low current-conducting resistance, and to remove said mark when it assumes its high current-block resistance, and means for conducting current through said device to cause said device to emit light in response to the occurrence of a pre-selected electrical condition on said line.

18. The station identification circuit defined in claim 17 wherein said means for conducting current through said device is responsive to an interruption of loop current through said pre-selected party's subscriber drop to cause the current to be conducted through said device, and wherein said device is a light emitting diode.

19. The station identification circuit defined in claim 17 wherein said resistor is connected at opposite ends by equal resistances to the tip and ring conductors of said pre-selected party's drop, and wherein a center tap on said resistor is connected to said earth grounded terminal to provide equal resistances between said terminal and the tip and ring conductors of said pre-selected party's subscriber drop.

20. A station identification circuit for identifying a pre-selected one of two parties on a two-party line in a telephone system when a call is initiated from the pre-selected party's telephone, comprising: a capacitor, means for enabling said capacitor to be charged by loop current flowing in the pre-selected party's subscriber drop when the flow of loop current is initiated by lifting the pre-selected party's telephone off-hook, current-conducting means, means for discharging current from the charged capacitor through said current-conducting means in response to and upon the occurrence of the first momentary interruption of loop current which takes place after the pre-selected party's telephone is brought off-hook to initiate a call, means providing a ground connection which is normally disconnected from the pre-selected party's drop when the pre-selected party's telephone is on-hook and means under the control of said current-conducting means for coupling said ground connection to at least the tip conductor of the pre-selected party's subscriber drop when said capacitor discharges current through said current-conducting means.

21. A station identification circuit for applying a ground mark to identify a pre-selected one of two parties on a two-party line in a telephone system when a call is initiated from the pre-selected party's telephone, comprising: a capacitor, means for enabling said capacitor to be charged by loop current flowing in the pre-selected party's subscriber drop when the flow of loop current is initiated by lifting the pre-selected party's telephone off-hook, current-conducting control means connected in series with one of the tip and ring conductors of the pre-selected party's subscriber drop to conduct loop current flow in the pre-selected party's subscriber drop, said capacitor being in parallel with said control means to discharge current through said control means when the loop current is momentarily interrupted by the central office in said telephone system, and means under the control of said control means for applying said ground mark to at least the tip conductor of the line connecting said pre-selected party's telephone to said central office whenever current is conducted through said control means.

22. A telephone ringer isolator comprising first and second terminals adapted to be d.c. coupled to the tip and ring conductors of a subscriber's line connecting a subscriber's telephone to a central office to provide for the application of the central office battery and a.c. ringing signal voltages across said terminals, a zener diode and a capacitor connected in series between said terminals such that said zener diode is forward biased by ringing signal alternations of one pre-selected polarity to rectify the central office ringing signal for supplying rectified ringing signal current to charge said capacitor, a current-conducting light-emitting device connected in series with said zener diode and in parallel with said capacitor in a discharge path for said capacitor, said device being in a non-conducting state in which it emits no light when the voltage across said capacitor is below a pre-selected value, and said device being responsive to an increase in the voltage across said capacitor above said pre-selected value to conduct current and to emit light upon conducting current, and circuit means under the control of said device for maintaining the ringer in said telephone disconnected from earth ground in absence of light emitted by said device, said circuit means being responsive to the light emitted by said device to complete a current conducting circuit that connects said ringer between said ground and one of said conductors for enabling said ringing signal to be conducted through said ringer to ring said ringer, the zener potential of said zener diode being greater than said pre-selected value and greater than the voltage applied across said terminals during the ringing signal alternations of the polarity that is opposite to said pre-selected polarity, and said zener potential further being less than approximately 500 volts to enable a.c. fault voltages having peak voltages of 500 volts or more to exceed the zener potential when applied to said terminals.

23. The telephone ringer isolator defined in claim 22 including a resistor connected between and in series with said zener diode and said capacitor in the charging path for said capacitor, said resistor and said capacitor being sized to provide said capacitor with a charging time constant that is less than one half the time period of a frequency of 60 Hz.

24. The telephone ringer isolator defined in claim 23 wherein said capacitor is the only capacitor connected intermediate said terminals.

25. The telephone ringer isolator defined in claim 22 wherein said circuit means under the control of said device comprises a Triac connected in the current conducting path between said ringer and said ground, and a light sensitive resistor connected between said ringer and said ground and also to the gate of said Triac to control the supply of gate current to said Triac, said light sensitive resistor being light coupled to said device to assume (a) a non-conducting state that prevents the conduction of gate current to said Triac when no light is emitted by said device and (b) a current-conducting state when light is emitted by said device to conduct gate current to said Triac to turn said Triac on, said Triac being effective upon turning on to complete the current conducting circuit that connects said ringer between said ground and said one of said conductors.

26. A telephone ringer isolator for use in a telephone system having a subscriber telephone connected by a subscriber line to a central office, comprising first and second terminals adapted to be connected to the tip and ring conductors of said line for receiving a.c. ringing signals that are applied to said line by said central office, first circuit means electrically connected between said first and second terminals and rendered effective by a ringing signal imposed on said terminals to develop a control voltage and to increase said control voltage to at least a pre-selected value, second circuit means for maintaining the ringer of said telephone disconnected from earth ground as long as said control voltage is below said pre-selected value, said second circuit means being rendered effective by said control voltage when it increases to at least said pre-selected value to complete a current-conducting circuit that connects said ringer between said ground and one of said conductors for enabling the central office ringing signal current to be conducted through said ringer for ringing said ringer, and third circuit means connected to said first circuit means and adapted to be connected to one of said conductors in place of said first terminal for reducing the voltage applied across said first circuit means to a value that is less than the voltage across said conductors to thereby facilitate the use of said telephone ringer isolator with central offices having elevated battery voltages in excess of approximately 50 volts.

27. The telephone ringer isolator defined in claim 26 wherein said third circuit means comprises a zener diode having a pre-selected zener potential and connected in series circuit relationship with said first circuit means.

28. A telephone ringer isolator for use in a telephone system having a telephone connected by a subscriber line to a central office, comprising first and second terminals, a circuit branch connected between said first and second terminals, said first and second terminals being adapted to be connected to the tip and ring conductors of said line such that the central office battery and a.c. ringing signal voltages developed by said central office are applied across said circuit branch, said circuit branch including a capacitor and a first zener diode in series with said cpacitor for rectifying the a.c. ringing signal and supplying the rectified ringing signal to charge said capacitor for developing a control voltage of pre-selected value across said capacitor, circuit means for maintaining the ringer of said telephone disconnected from earth ground in absence of said control voltage, said circuit means being rendered effective by said control voltage to complete a current-conducting circuit that connects said ringer between said ground and one of the tip and ring conductors of said line for enabling the central office ringing signal to be conducted through said ringer for ringing said ringer, said first zener diode being connected between said first terminal and said capacitor, a third terminal, a second zener diode connected between said third terminal and said first zener diode such that said second zener diode, said first zener diode and capacitor are all connected in series between said third and second terminals, said third terminal being adapted to optionally be connected to one of said conductors in place of said first terminal to provide for application of the central office battery and ringing signal voltages across the series combination of said second zener diode, said first zener diode and said capacitor, said second zener diode being poled oppositely from said first zener diode to reduce the voltage applied across the series combination of said first zener diode and said capacitor by an amount corresponding to the zener potential of said second zener diode.

29. A telephone ringer isolator for use in a telephone system having a telephone connected by a subscriber line to a central office, comprising frequency selective circuit means adapted to be connected to said line and tuned to pass the a.c. ringing signal that is supplied by said central office to ring said telephone, an SCR having its anode and cathode electrodes connected intermediate the ringer of said telephone and a ground connection to provide a current conducting path between the ringer and the ground connection upon being switched on, and further circuit means electrically connected intermediate said frequency selective circuit means and the control electrode of said SCR for rectifying the ringing signal passed by said frequency selective circuit means and for applying the rectified ringing signal to said control electrode, said SCR normally being in its non-conducting state in absence of said rectified ringing signal for maintaining said ringer disconnected from said ground connection, and said SCR further being driven into conduction by application of the rectified ringing signal to its control electrode for completing a current-conducting circuit that connects said ringer between said ground connection and one of the tip and ring conductors of said line and thus enabling current to be conducted through said ringer to ring said ringer.

30. The telephone ringer isolator defined in claim 29 wherein said frequency selective circuit means is a resonant circuit.

31. The telephone ringer isolator defined in claim 29 wherein said frequency selective circuit means is a resonant circuit in the primary side of the transformer.

32. A unit adapted to be connected outdoors of a tip party's building to the tip party's subscriber drop in a two party telephone circuit wherein the telephones of the tip party and the ring party are connected by separate subscriber drops to a common two-party line and wherein the tip party's telephone has a hook switch connected between tip and ring terminals and a ringer connected between the tip terminal and a grounding terminal, said unit comprising an earth grounded terminal, a ringer isolator circuit connected to said earth grounded terminal and adapted to be connected to the tip and ring conductors of the tip party's subscriber drop and also to tip, ring and grounding terminals of the tip party's telephone, an ANI mark circuit connected to said earth grounded terminal and adapted to be connected to the tip and ring conductors of the tip party's subscriber drop, switching means in said ringer isolator circuit for maintaining an open circuit between said grounding terminal and said earth grounded terminal in absence of a central office supplied ringing signal for ringing the tip party's telephone, further means forming a part of said ringer isolator circuit and being responsive to a central office ringing signal for the tip party for operating said switching means to cause said switching means to complete a current-conducting circuit between said grounding terminal and said earth grounded terminal to enable ringing signal current to be conducted through said ringer to ring the tip party's telephone, and means in said ANI mark circuit and responsive to the occurrence of a predetermined electrical condition on the subscriber drop for the tip party's telephone for establishing a current conduction path between said earth grounded terminal and at least the tip conductor of the tip party's subscriber drop to thereby apply a ground mark to said tip conductor whenever a call is initiated from the tip party's telephone.

33. The unit defined in claim 32 including a three electrode gas tube protector has a center electrode connected to said earth grounded terminal and two end electrodes adapted to the tip and ring conductors of the tip party's subscriber's drop.

34. In a two-party telephone circuit providing service to a tip party's telephone and ring party's telephone wherein at least the tip party's telephone has separate tip, ring and ground return leads, a transmission line extending from a central office, a first subscriber drop interposed between said line and said tip party's telephone for connecting the tip party's telephone to said line, and a unit disposed exteriorly of the tip party's telephone, said unit providing a ground connection and comprising ringer isolator circuit means and ANI mark circuit means, said ringer isolator circuit means being connected to said ground return lead, said ground connection and the tip and ring conductors of said first subscriber drop for keeping the ringer in the tip party's telephone disconnected from said ground connection except when a ringing signal is supplied by the central office to ring the tip party's telephone, and said ANI mark circuit means being electrically connected to said ground connection and said first drop and responsive to the occurrence of a predetermined electrical condition on said first drop for electrically connecting said ground connection to at least the tip conductor of said first drop to apply a ground mark to the tip conductor when a call is initiated from the tip party's telephone.

35. A ground mark identification circuit for identifying a pre-selected one of two parties on a two-party line in a telephone system when a call is initiated from the pre-selected party's telephone, comprising: means providing a ground connection which is normally disconnected from said line when said pre-selected party's telephone is on-hook, and means responsive to the first interruption of loop current occurring after said pre-selected party's telephone is brought off-hook to initiate a call for electrically connecting said ground connection to at least the tip conductor of said line regardless of the presence or absence of negative voltage on said tip conductor.

36. A ground mark identification circuit for identifying a pre-selected one of two parties on a two-party, two-conductor line in a telephone system when a call is initiated from the pre-selected party's telephone, comprising: a current-conducting light-emitting device which emits light when current is conducted therethrough, means for conducting current through said device to cause it to emit light in response to the occurrence of a pre-selected electrical condition on said line after said pre-selected party's telephone is brought off-hook to initiate a call, means providing a ground connection, and light-sensitive resistor means light coupled to said device to assume a low current-conducting resistance when said device emits light and a high current-blocking resistance when no light is emitted by said device, said light sensitive resistor means being connected intermediate said ground connection and at least the tip conductor of said line to apply a ground mark to said tip conductor when it assumes its low current-conducting resistance and to remove said ground mark from said tip conductor when it assumes its light current-blocking resistance.

37. The ground mark identification circuit defined in claim 36 wherein said light sensitive resistor means is formed by a light-sensitive resistor bridged across the tip and ring conductors of said line and having a center tap connected to said ground connection.

* * * * *